United States Patent
Allen et al.

(10) Patent No.: US 9,797,088 B2
(45) Date of Patent: Oct. 24, 2017

(54) METHODS OF TREATING TEXTILE FIBRES

(75) Inventors: Warrick James David Allen, Tewkesbury (GB); James Leonard Rolfe, Tewkesbury (GB); Andrea Duffy, Tewkesbury (GB); Nicholas Horrocks, Tewkesbury (GB)

(73) Assignee: Syntor Fine Chemicals Limited, Manchester (GB)

(*) Notice: Subject to any disclaimer, the term of this patent is extended or adjusted under 35 U.S.C. 154(b) by 941 days.

(21) Appl. No.: 13/814,177

(22) PCT Filed: Aug. 2, 2011
(Under 37 CFR 1.47)

(86) PCT No.: PCT/GB2011/051460
§ 371 (c)(1),
(2), (4) Date: May 7, 2014

(87) PCT Pub. No.: WO2012/017234
PCT Pub. Date: Feb. 9, 2012

(65) Prior Publication Data
US 2014/0315022 A1  Oct. 23, 2014

(30) Foreign Application Priority Data
Aug. 2, 2010 (GB) .................................. 1012948.4
Oct. 4, 2010 (GB) .................................. 1016644.5

(51) Int. Cl.
| | | |
|---|---|---|
| D06P 1/52 | (2006.01) | |
| D06M 15/59 | (2006.01) | |
| C09D 139/02 | (2006.01) | |
| D06M 15/356 | (2006.01) | |
| D06P 1/39 | (2006.01) | |
| D06P 1/41 | (2006.01) | |
| D06P 3/24 | (2006.01) | |
| D06P 3/52 | (2006.01) | |

(52) U.S. Cl.
CPC .............. *D06P 1/52* (2013.01); *C09D 139/02* (2013.01); *D06M 15/3562* (2013.01); *D06M 15/3566* (2013.01); *D06M 15/59* (2013.01); *D06P 1/39* (2013.01); *D06P 1/41* (2013.01); *D06P 1/525* (2013.01); *D06P 1/5242* (2013.01); *D06P 3/241* (2013.01); *D06P 3/242* (2013.01); *D06P 3/521* (2013.01); *D06P 3/522* (2013.01); *Y10T 428/2969* (2015.01)

(58) Field of Classification Search
None
See application file for complete search history.

(56) References Cited

U.S. PATENT DOCUMENTS

| | | | | |
|---|---|---|---|---|
| 4,530,874 A | * | 7/1985 | Hendrix ................ | D06C 19/00 427/258 |
| 6,559,261 B1 | * | 5/2003 | Milne .................... | C07C 69/50 526/279 |
| 2003/0054141 A1 | * | 3/2003 | Worley ............... | A41D 31/0038 428/195.1 |

FOREIGN PATENT DOCUMENTS

WO   WO-94/28053   12/1994

OTHER PUBLICATIONS

Restriction Requirement on U.S. Appl. No. 13/814,183 dated Nov. 1, 2016.
Non-Final Office Action on U.S. Appl. No. 13/814,183 dated Mar. 29, 2017.

* cited by examiner

*Primary Examiner* — Jeffrey Washville
(74) *Attorney, Agent, or Firm* — Foley & Lardner LLP

(57) ABSTRACT

According to the invention there is provided a method of treating textile fibers including the steps of: providing a polymeric precursor which includes a group of sub-formula (I) where $R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents, $R^1$ is selected from hydrogen, halo, nitro, hydrocarbyl, optionally substituted or interposed with functional groups, or $-R^3-R^5=Y^1$, and $R^{13}$ is C(O) or $S(O)_2$; coating the textile fibers with the polymeric precursor; and polymerizing the polymeric precursor so as to produce a polymeric coating on the textile fibers.

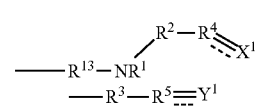

[I]

14 Claims, No Drawings

METHODS OF TREATING TEXTILE FIBRES

CROSS-REFERENCE TO RELATED APPLICATIONS

This application represents the national stage entry of PCT International Application No. PCT/GB2011/051460 filed on Aug. 2, 2011 and claims the benefit of Great Britain Patent Applications No. 1012948.4 filed Aug. 2, 2010 and 1016644.5 filed Oct. 4, 2010. The contents of all of these applications are hereby incorporated by reference as if set forth in their entirety herein.

This invention relates to methods of treating textile fibres and to certain monomers and related polymers suitable for this purpose, with particular, but by no means exclusive, reference to adhesion promotion of textile fibres to promote bonding with polymeric materials and to fix dyes thereon.

Textiles are of course ubiquitous and extremely important structures which are used in a variety of commercial and technological applications. There is an ongoing need to expand the range of these applications in order to provide new and improved application areas, and also to improve textile properties. This is the broad aim of the present invention. Additionally, the present inventors have identified two more specific areas in which improvements in textile applications and/or properties would be highly desirable, but hitherto have not been possible. It would be highly desirable to effectively bond a textile to a polymeric material, but traditionally it has proved very difficult. Particular difficulties have been encountered in attempting to bond textiles to low surface energy polymers such as rubbers and other elastomers. Another area of significant importance relates to the fixing of dyes onto textiles, where good adhesion is highly desirable in order to enhance colour fastness. A further problem relates to the treatment of polyaramid (hereinafter termed 'aramid') textiles by dyeing or any other coating process, since it is very difficult to obtain adhesion onto aramid fibres. Aramid fibres are well known for possessing excellent impact absorption properties and strength, and are used in a variety of related applications, such as in protective clothing. Probably the most widely known commercial example of an aramid textile is Kevlar®.

The present invention, in at least some of its embodiments, addresses the above named problems, needs and desires.

According to a first aspect of the invention there is provided a method of treating textile fibres the steps of:

providing a polymeric precursor which includes a group of sub-formula (I)

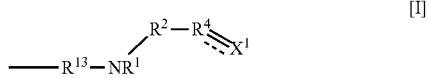

[I]

where $R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents, $R^1$ is selected from hydrogen, halo, nitro, hydrocarbyl, optionally substituted or interposed with functional groups, or —$R^3$-$R^5$=$Y^1$, and $R^{13}$ is C(O) or S(O)$_2$;

coating the textile fibres with the polymeric precursor; and polymerising the polymeric precursor so as to produce a polymeric coating on the textile fibres.

The polymeric coating can be used advantageously for adhesion promotion purposes, for example to promote adhesion of the textile fibres to a polymeric material or to one or more dyes. However, the polymeric coating can be used for other purposes. For example, the polymeric precursor may be part of a formulation which contains one or more additives, in which instance the polymeric coating may be used as a binder to bind the additives to the textile fibres. Alternatively still, the polymeric coating may of itself impart useful properties, such as protective properties.

International publications WO00/06610, WO00/06533, WO00/06658 and WO01/40874, the contents of all of which are herein incorporated by reference, disclose a wide range of polymers of the dienyl type, corresponding monomers, and methods for preparing the polymers and monomers. Some of the polymers described in these publications correspond to polymers which might be used in the present invention. However, these publications do not even suggest that textile fibres might be coated for a variety of purposes.

For the avoidance of doubt, the term 'polymeric precursor' includes reference to monomers, and also to pre-polymers obtained by partial or pre-polymerisation of one or more monomers.

Preferably, the polymeric precursor is polymerised by exposure to ultraviolet radiation. Alternative polymerisation methods include the application of heat (which may be in the form of IR radiation), where necessary in the presence of an initiator, by the application of other sorts of initiator such as chemical initiators, or by initiation using an electron beam. The expression "chemical initiator" as used herein refers to compounds which can initiate polymerisation such as free radical initiators and ion initiators such as cationic or anionic initiators as are understood in the art. In the preferred embodiments in which the monomer is polymerised by exposure to ultraviolet radiation, polymerisation may take place either spontaneously or in the presence of a suitable initiator. Examples of suitable initiators include 2,2'-azobisisobutyronitrile (AIBN), aromatic ketones such as benzophenones in particular acetophenone; chlorinated acetophenones such as di- or tri-chloracetophenone; dialkoxyacetophenones such as dimethoxyacetophenones (sold under the trade name "Irgacure 651") dialkylhydroxyacetophenones such as dimethylhydroxyacetophenone (sold under the trade name "Darocure 1173"); substituted dialkylhydroxyacetophenone alkyl ethers such compounds of formula

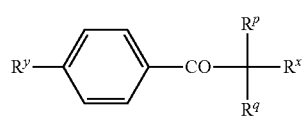

where $R^y$ is alkyl and in particular 2,2-dimethylethyl, $R^x$ is hydroxyl or halogen such as chloro, and $R^p$ and $R^q$ are independently selected from alkyl or halogen such as chloro (examples of which are sold under the trade names "Darocure 1116" and "Trigonal P1"); 1-benzoylcyclohexanol-2 (sold under the trade name "Irgacure 184"); benzoin or derivatives such as benzoin acetate, benzoin alkyl ethers in particular benzoin butyl ether, dialkoxybenzoins such as dimethoxybenzoin or deoxybenzoin; dibenzyl ketone; acyloxime esters such as methyl or ethyl esters of acyloxime (sold under the trade name "Quantaqure PDO"); acylphosphine oxides, acylphosphonates such as dialkylacylphosphonate, ketosulphides for example of formula

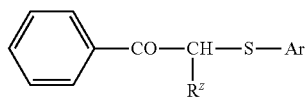

where $R^z$ is alkyl and Ar is an aryl group; dibenzoyl disulphides such as 4,4'-dialkylbenzoyldisulphide; diphenyldithiocarbonate; benzophenone; 4,4'-bis(N,N-dialkyamino) benzophenone; fluorenone; thioxanthone; benzil; or a compound of formula

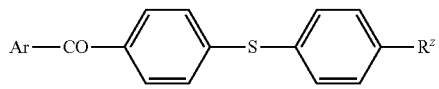

where Ar is an aryl group such as phenyl and $R^z$ is alkyl such as methyl (sold under the trade name "Speedcure BMDS").

As used herein, the term "alkyl" refers to straight or branched chain alkyl groups, suitably containing up to 20 and preferably up to 6 carbon atoms. The terms "alkenyl" and "alkynyl" refer to unsaturated straight or branched chains which include for example from 2-20 carbon atoms, for example from 2 to 6 carbon atoms. Chains may include one or more double to triple bonds respectively. In addition, the term "aryl" refers to aromatic groups such as phenyl or naphthyl.

The term "hydrocarbyl" refers to any structure comprising carbon and hydrogen atoms. For example, these may be alkyl, alkenyl, alkynyl, aryl such as phenyl or napthyl, arylalkyl, cycloalkyl, cycloalkenyl or cycloalkynyl. Suitably they will contain up to 20 and preferably up to 10 carbon atoms. The term "heterocyclyl" includes aromatic or non-aromatic rings, for example containing from 4 to 20, suitably from 5 to 10 ring atoms, at least one of which is a heteroatom such as oxygen, sulphur or nitrogen. Examples of such groups include furyl, thienyl, pyrrolyl, pyrrolidinyl, imidazolyl, triazolyl, thiazolyl, tetrazolyl, oxazolyl, isoxazolyl, pyrazolyl, pyridyl, pyrimidinyl, pyrazinyl, pyridazinyl, triazinyl, quinolinyl, isoquinolinyl, quinoxalinyl, benzthiazolyl, benzoxazolyl, benzothienyl or benzofuryl.

The term "functional group" refers to reactive groups such as halo, cyano, nitro, oxo, $C(O)_nR^a$, $OR^a$, $S(O)_tR^a$, $NR^bR^c$, $OC(O)NR^bR^c$, $C(O)NR^bR^c$, $OC(O)NR^bR^c$, $-NR^7C(O)_nR^6$, $-NR^aCONR^bR^c$, $-C=NOR^a$, $-N=CR^bR^c$, $S(O)_tNR^bR^c$, $C(S)_nR^a$, $C(S)OR^a$, $C(S)NR^bR^c$ or $-NR^bS(O)_tR^a$ where $R^a$, $R^b$ and $R^c$ are independently selected from hydrogen or optionally substituted hydrocarbyl, or $R^b$ and $R^c$ together form an optionally substituted ring which optionally contains further heteroatoms such as $S(O)_s$, oxygen and nitrogen, n is an integer of 1 or 2, t is 0 or an integer of 1-3. In particular, the functional groups are groups such as halo, cyano, nitro, oxo, $C(O)_nR^a$, $OR^a$, $S(O)_tR^a$, $NR^bR^c$, $OC(O)NR^bR^c$, $C(O)NR^bR^c$, $OC(O)NR^bR^c$, $-NR^7C(O)_nR^6$, $-NR^aCONR^bR^c$, $-NR^aCSNR^bR^c$, $C=NOR^a$, $-N=CR^bR^c$, $S(O)_tNR^bR^c$, or $-NR^bS(O)_tR^a$ where $R^a$, $R^b$ and $R^c$, n and t are as defined above.

The term "heteroatom" as used herein refers to non-carbon atoms such as oxygen, nitrogen or sulphur atoms. Where the nitrogen atoms are present, they will generally be present as part of an amino residue so that they will be substituted for example by hydrogen or alkyl.

The term "amide" is generally understood to refer to a group of formula $C(O)NR^aR^b$ where $R^a$ and $R^b$ are hydrogen or an optionally substituted hydrocarbyl group. Similarly, the term "sulphonamide" will refer to a group of formula $S(O)_2NR^aR^b$. Suitable groups $R^a$ include hydrogen or methyl, in particular hydrogen.

The nature of any electron withdrawing group or groups additional to the amine moiety used in any particular case will depend upon its position in relation to the double bond it is required to activate, as well as the nature of any other functional groups within the compound. The term "electron withdrawing group" includes within its scope atomic substituents such as halo, e.g. fluoro, chloro and bromo, and also molecular substituents such as nitrile, trifluoromethyl, acyl such as acetyl, nitro, or carbonyl.

Where $R^{11}$ is an electron withdrawing group, it is suitably acyl such as acetyl, nitrile or nitro.

Preferably, $R^7$ and $R^8$ are independently selected from fluoro, chloro or alkyl or H. In the case of alkyl, methyl is most preferred.

Preferably, $X^2$, $X^3$, $Y^2$ and $Y^3$ are all hydrogen.

Alternatively, it is possible that at least one, and possibly all, of $X^2$, $X^3$, $Y^2$ and $Y^3$ is a substituent other than hydrogen or fluorine, in which instance it is preferred that at least one, and possibly all, of $X^2$, $X^3$, $Y^2$ and $Y^3$ is an optionally substituted hydrocarbyl group. In such embodiments, it is preferred that at least one, and most preferably all, of $X^2$, $X^3$, $Y^2$ and $Y^3$ is an optionally substituted alkyl group. Particularly preferred examples are $C_1$ to $C_4$ alkyl groups, especially methyl or ethyl. Alternatively, at least one, and preferably all, of $X^2$, $X^3$, $Y^2$ and $Y^3$ are aryl and/or heterocyclic such as pyridyl, pyrimidinyl, or a pyridine or pyrimidine containing group.

In preferred embodiments, $R^1$ is $-R^3-R^5\!=\!\!=\!Y^1$, $X^1$ and $Y^1$ are groups $CX^2X^3$ and $CY^1Y^2$ respectively and the dotted lines represent an absence of a bond. In these embodiments, the polymerisation may proceed by a cyclopolymerisation reaction.

A preferred group of polymeric precursors are compounds of structure (II)

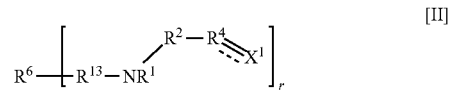

and in particular compounds of formula (III)

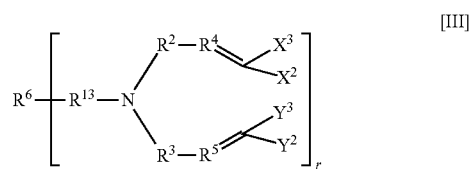

where r is an integer of 1 or more and $R^6$ is one or more of a binding group, an optionally substituted hydrocarbyl group, a perhaloalkyl group, a siloxane group, an amide, or a partially polymerised chain containing repeat units Where in the compounds of formulae (II) and (III), r is 1, compounds can be readily polymerised to form a variety of polymer types depending upon the nature of the group $R^6$. Embodiments in which r is 1 or 2 are most preferred.

Where in the compounds of formula (II), r is greater than one, polymerisation can result in polymer networks. On polymerisation of these compounds, networks are formed whose properties maybe selected depending upon the precise nature of the $R^6$ group, the amount of chain terminator present and the polymerisation conditions employed. Some examples of bridging groups can be found in WO 00/06610.

Preferably, r is 1, 2, 3 or 4.

Preferably, $R^6$ comprises a straight or branched chain hydrocarbyl group, optionally substituted or interposed with functional groups. Advantageously, the straight or branched chain hydrocarbyl is interposed or substituted with one or more of an amine moiety, C(O) or COOH.

In some embodiments, the polymeric precursor is a monomer in which $R^6$ is a straight or branched chain hydrocarbyl interposed with an amine moiety, or a pre-polymer obtained by pre-polymerisation of said monomer. Polymeric precursors of this type can be highly advantageous in promoting the adhesion of textile fibres to polymeric materials, and in promoting the adhesion of acid dyes to textile fibres. Preferably, the monomer is a straight or branched chain alkyl group having 1 to 30 carbon atoms, optionally interposed with a cyclic group. In particular in preferred embodiments, the monomer is a compound of formula (IV)

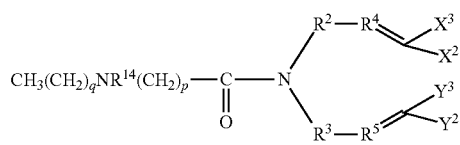

[IV]

where $R^{14}$ is H or $C_sH_{2s+1}$, p is 1 to 10, 9 is 0 to 10 and s is 1 to 10.

In other preferred embodiments, the monomer is a compound of formula (V)

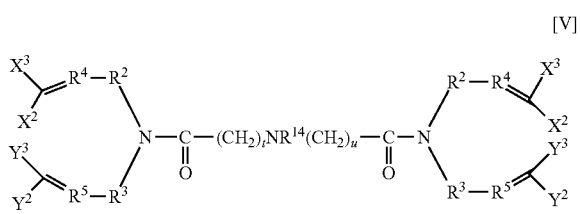

[V]

where t and u are independently 1 to 10 and $R^{14}$ is H or $C_sH_{2s+1}$, where s is 1 to 10.

In other preferred embodiments, the polymeric precursor is a monomer in which $R^6$ is a straight or branched chain hydrocarbyl substituted with a COOH end group, or a pre-polymer obtained by pre-polymerisation of said monomer. The monomer may be a straight or branched chain alkyl group having 1 to 30 carbon atoms, optionally interposed with a cyclic group. Advantageously, the monomer is a compound of formula (VI)

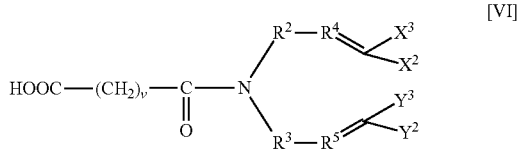

[VI]

where v is 1 to 20.

In alternative embodiments, the polymeric precursor is a monomer in which $R^6$ is a straight or branched chain alkyl group having 1 to 30 carbon atoms, or a pre-polymer obtained by pre-polymerisation of said monomer. Polymeric precursors of this type can be advantageous in promoting adhesion between textile fibres and polymeric materials.

In other embodiments still, the polymeric precursor is a monomer in which, $R^6$ is a partially or per-halogenated straight or branched chain alkyl group having 1 to 30 carbon atoms, or a pre-polymer obtained by pre-polymerisation of said monomer. Polymeric precursors of this type can be advantageously used to promote adhesion of dyes onto textile fibres. Preferably, the alkyl group is per-halogenated. It is preferred that the alkyl group is fluorinated, most preferably per-fluorinated.

In other embodiments still, the polymeric precursor is a monomer in which $R^{13}$ is CO and $R^6$ terminates in one or more amine moieties forming a urea structure, or a pre-polymer obtained by pre-polymerisation of said monomer.

In yet further embodiments, the polymeric precursor is a monomer of structure (VII)

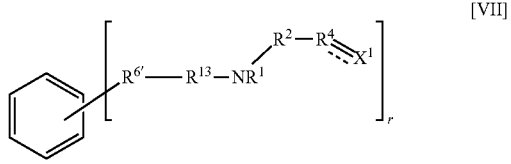

[VII]

where $R^{6'}$ is a straight or branched chained hydrocarbyl group, optionally substituted or interposed with functional groups, and r is an integer of two or more, or a pre-polymer obtained by a pre-polymerisation of said monomer. Preferably, r is two or three. Polymeric precursors of this type can be advantageously used to promote adhesion of textile fibres to polymeric materials, and to promote adhesion of dyes to textile fibres.

The step of polymerising the polymeric precursor may produce a homopolymer.

Alternatively, the step of polymerising the polymeric precursor may produce a copolymer, the polymeric precursor being mixed with one or more other polymeric precursor. The other polymeric precursor may be according to any of the formulae described herein. Alternatively, the co-monomer may be of a different class of compounds. The monomer may be copolymerised with a cross-linker. In these embodiments, the polymeric precursor may be reacted with a compound of the following formula

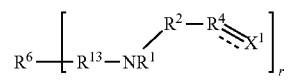

where $R^1$, $R^2$, $R^4$, $R^{13}$, and $X^1$ are as defined in relation to formula (I), r is an integer of 2 or more, and $R^6$ is a bridging group of valency r or a bond. Preferably, r is 2. The use of a compound of formula (XI) is particularly advantageous when the polymeric precursor does not include the group —R³-R⁵≕Y¹. However, embodiments of polymeric precursors which include the group —R³-R⁵≕Y¹ may also be reacted with a compound of formula (XII).

The cross-linker may be a compound of formula (XIII)

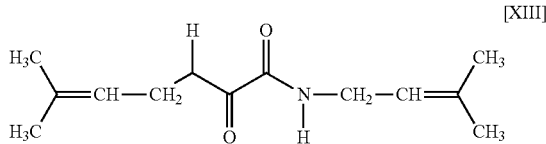 [SMILES: CC(C)=CCCC(=O)C(=O)NCC=C(C)C]

[XIII]

Other examples of cross-linkers include N,N,N,N-Tetraallylethanediamide and 2,2',2'',2'''-(ethane-1,2-diylbis(azanetriyl))tetrakis(N,N-diallylacetamide).

The monomer or co-monomers may be pre-polymerised to produce a polymeric precursor. Typically, a thermal initiator is used and pre-polymerisation is performed at an elevated temperature above ambient temperature.

The textile fibres may be synthetic fibres. Examples of synthetic textile fibres which may be treated in accordance with the invention are aramid, nylon and polyester. Thus, the treated textile fibres may include aramid, nylon or polyester fibres. The textile fibres may consist entirely of aramid fibres, or may comprise a mixture of aramid fibres and fibres of at least one other kind. The aramid fibres may be meta-aramid fibres and/or para-aramid fibres. Examples of suitable aramid fibres are Kevlar®, Kermel® and Twaron®. Examples of mixtures of aramid fibres with fibres of another kind or kinds include various mixtures of aramid fibres with viscose fibres, which may be flame retardant (FR) viscose fibres. Blends such as a 50% aramid/50% FR viscose mixture or a mixture of para-aramid, rayon and polybenzimidazole fibres may be used.

The treatment of natural fibres is also in the scope of the invention.

The method may be used for dyeing textile fibres, and may include the further step of contacting the textile fibres with at least one dye, in which the polymeric coating acts to promote adhesion of the dye to the textile fibres. It is highly advantageous that aramid textile fibres may be dyed in this manner.

The dye may be an acid dye or a basic dye. Adhesion to acid and basic dyes can be advantageously enhanced by the provision of one or more suitable functional groups within the polymeric precursor. For example, an amine moiety may be advantageously used in conjunction with acid dyes, and a carboxyl substituent may be advantageously used in conjunction with a basic dye. Without wishing to be bound by any one particular theory or conjecture, it is believed that the presence of these functional groups allows bonding or another interaction to occur between the functional group and the dye. The use of other types of dye is within the scope of the invention. Furthermore, the invention is not limited to bonding or interactions between the function group and the dye. For example, it is envisaged that dyes may be retained on the textile fibres through other mechanisms, such as diffusion into the polymeric structure of the coating.

In other, at least one substance, such as a pigment, is contained in a binder, and the polymeric coating acts to promote adhesion to the binder and/or substance to the textile fibres. Binders and useful substances which are well known in the art may be used. For example, carbon black may be used as a pigment. It is possible to use a binder containing one or more dyes.

The textile fibres may be a plain, uncoloured textile fibres. Alternatively, and advantageously, the textile fibres beneath the polymeric coating may be pre-coloured with one or more pre-colouring light absorbing substances. It is understood that such pre-colouring light absorbing substances are present on the textile fibres prior to coating with the polymeric coating, and therefore are situated underneath the polymeric coating. An advantage with using pre-coloured textile fibres is that it reduces the complexity and expense of any subsequent step in which colouring substances such as dyes and pigments are adhered onto the polymeric coating. The polymeric coating of the invention can adhere well to pre-coloured textile fibres as well as to plain, uncoloured textile fibres.

The treatment of the textile fibres may be for bonding the textile fibres to a polymeric material, and may include a further step of contacting the textile fibres with the polymeric material, in which the polymeric coating acts to promote adhesion of the polymeric material to the textile fibres. Although textile fibres may be adhered to a range of polymeric materials in this way, it is particularly advantageous that adhesion to low surface energy polymeric materials can be achieved. In preferred embodiments, the polymeric material is an elastomer. For the avoidance of doubt, the term "elastomer" includes reference to natural and synthetic rubbers. Textile fibres may be adhered to various elastomers which have traditionally been difficult to adhere to, such as silicone rubbers, fluoro-silicone rubbers, fluorocarbon rubbers or ethylene propylene rubbers (EPDM).

Typically, the textile fibres are contacted with the polymeric material under conditions of elevated temperature and/or pressure.

In this way, a composite structure can be formed having a textile bonded to a polymeric material. The textile fibres may be adhered to a hosing or belt formed from the polymeric material. Reinforced rubber pressure hosing can be produced. Other applications include the manufacture of tyres and air cushions.

According to a second aspect of the invention there is provided a textile fibre or fibres having a polymeric coating, in which the polymeric coating includes a polymer formed by polymerising a polymeric precursor which includes a group of sub-formula (I)

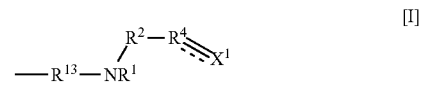

[I]

where R² and R³ are independently selected from (CR⁷R⁸)ₙ, or a group CR⁹R¹⁰, CR⁷R⁸CR⁹R¹⁰ or CR⁹R¹⁰CR⁷R⁸ where n is 0, 1 or 2, R⁷ and R⁸ are independently selected from hydrogen, halo or hydrocarbyl, and either one of R⁹ or R¹⁰ is hydrogen and the other is an electron withdrawing group, or R⁹ and R¹⁰ together form an electron withdrawing group, and R⁴ and R⁵ are independently selected from CH or CR¹¹ where R¹¹ is an electron withdrawing group, the dotted lines indicate the presence or absence of a bond, X¹ is a group CX²X³ where the dotted line bond to which it is attached is absent and a group CX² where the dotted line bond to which it is attached is present, Y¹ is a group CY²Y³ where the dotted line bond to which it is attached is absent and a group CY² where the dotted line bond to which it is attached is present, and $X^2$, $X^3$, $Y^2$ and $Y^3$ are independently selected from hydrogen, fluorine or other substituents, $R^1$ is selected from hydrogen, halo, nitro, hydrocarbyl, optionally substituted or interposed with functional groups, or —$R^3$-$R^5$≕$Y^1$, and $R^{13}$ is C(O) or S(O)$_2$.

Whilst the invention has been described above, it extends to any inventive combination or sub-combination of the features set out above or in the following description or claims. For example, elements of the first aspect of the invention may be combined with elements of the second aspect of the invention.

Unless otherwise stated, all percentages described below are wt %.

EXAMPLE 1 ADHESION PROMOTION OF M-ARAMID TO SILICONE AND FLUOROELASTOMER USING N,N-DIALLYL-3-(PROPYLAMINO)PROPANAMIDE AND N,N,N,N-TETRAALLYLETHANEDIAMIDE

To a mixture of N,N-Diallyl-3-(propylamino)propanamide and N,N,N,N-Tetraallylethanediamide (in the ratio of 9:1 by weight) a thermal initiator was added (Vazo 67, DuPont, 5% weight of total monomer mixture) and stirred until fully dissolved. The mixture was then maintained at 70° C. for 8 hours with constant stirring to produce a viscous yellow oil, to which a photoinitiator was added (Ciba Irgacure 819, 2% by weight) and mixed thoroughly.

This formulation was then applied onto each side of a strip of m-aramid cloth (DuPont Nomex) at a coating weight of approximately 5 grams per square meter. The coating was cured sequentially after each layer was deposited using focused 200 W/cm UV source with an iron doped mercury bulb.

Strips of fluoro-elastomer and silicone compounds containing initiators or other curing agents were placed on each side of the adhesion promoted textile and then treated at 190° C. at 65-80 psi for 15 minutes to cure fluoro-elastomer and silicone rubber and bond them to the textile.

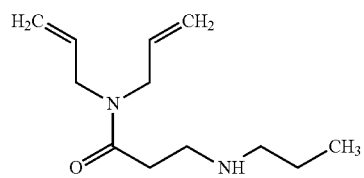

N, N-Diallyl-3-(propylamino)propanamide)

Synthesis of
N,N-Diallyl-3-(propylamino)propanamide 3-bromopropionylchloride in dichloromethane (1:1 v/v) was added drop wise to a slight molar excess of diallylamine in dichloromethane (DCM) at ~10° C. over 2 hours with constant stirring. This was then washed in dilute HCl and dichloromethane and the organic fraction retained. The solution of product in DCM was then purified by column chromatography using silica (60 A) and the DCM removed to yield the 3-bromo-N,N-diallylpropylamide intermediate; a yellow liquid. Yield 70%.

The 3-bromo-N,N-diallylpropylamide intermediate (30 g, 129 mmoles) was added to THF (1:1 v/v). This was then added dropwise over 2 hours into a stirred, refluxing mixture of 1-propylamine (43.1 g, 0.730 mmoles), potassium carbonate (90 g, 0.652 mmoles) and THF (133.6 g, 1.850 mmoles). The reflux was then left to cool over 1 hour with constant stirring.

The cooled reaction mixture was washed in water (400 ml), dissolving the potassium carbonate and leaving a clear, yellow organic top layer, which was decanted off. This layer was then washed again in water, separated and dried to yield a yellow liquid N,N-Diallyl-3-(propylamino)propanamide product. Yield ~65%.

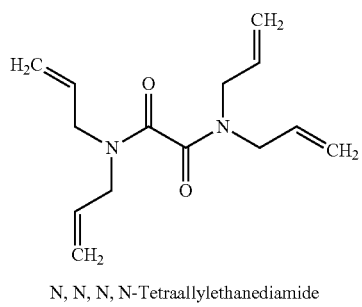 [SMILES: C=CCN(CC=C)C(=O)C(=O)N(CC=C)CC=C]

N, N, N, N-Tetraallylethanediamide

Synthesis of N,N, N,N-Tetraallylethanediamide

Fresh, dry oxaloyl chloride (ClOOCCOOCl) (200 mmoles) was placed into a 3-necked round bottomed (RB) flask with 200 ml of dry dichloromethane. Freshly distilled diallylamine (400 mmoles) was added to triethylamine (400 mmoles), further diluted (1:1 v/v) in dry dichloromethane then added into a dropping funnel and placed onto the reaction flask. Nitrogen gas was pumped through the vessel through the other two necks. To neutralise HCl produced, the waste gas was bubbled through a CaCO$_3$ solution. The reaction vessel was then placed into a salt water/ice bath and once the contents were cooled the diallylamine/triethylamine/DCM was added dropwise to the acid chloride solution with continual magnetic stirring of the mixture. The temperature was monitored and maintained between 5-10° C. The dropping of the diallylamine and triethylamine was stopped after three hours and the reaction was left to stir for another hour.

Thin layer chromatography using ethyl acetate and an alumina was used to monitor the reaction comparing starting material to the product. Iodine was used to develop the plate and the reaction product could be seen as a spot that had been eluted much further than the starting material.

To remove the amine chloride and excess diallylamine the reaction liquor was washed in 3M HCl. The monomer stayed in the DCM fraction and was removed using a separating funnel. Two washes of 100 ml HCl were used. The solvent was then removed in a rotary evaporator.

The product was added to dichloromethane (1:1 v/v) and passed through a silica gel (Merck, grade 60 for chromatography) column with dichloromethane as the eluent.

EXAMPLE 2 ADHESION PROMOTION OF M-ARAMID TO EPDM RUBBER USING N,N-DIALLYL-3-(PROPYLAMINO)PROPANAMIDE AND N,N,N',N'-TETRAALLYLETHANEDIAMIDE

The same formulation coating method as used in example 1 was used with a woven m-aramid fabric but instead placed between two sheets of EPDM rubber compound. The m-aramid fabric was bonded to the EPDM under elevated pressure (45-75 psi) and temperature (190° C.) for 15 minutes.

EXAMPLE 3 ADHESION PROMOTION OF M-ARAMID TO SILICONE RUBBER AND FLUOROELASTOMER USING BENZENE-1,3,5-TRICARBOXYLIC ACID-TRIS-N,N-DIALLYL-AMIDE AND 2,2',2'',2'''-(ETHANE-1,2-DIYLBIS(AZANETRIYL))TETRAKIS(N,N-DIALLYLACETAMIDE)

A mixture of benzene-1,3,5-tricarboxylic acid-tris-N,N-Diallylamide and 2,2',2'',2'''-(ethane-1,2-diylbis(azanetriyl))tetrakis(N,N-diallylacetamide) was made in a 9:1 ratio by weight, respectively. Photoinitiator (Ciba Irgacure 127) was added at 3% of total weight of monomer mixture and dissolved by maintaining gentle heating of the mixture. This formulation was then applied onto each side of a strip of m-aramid cloth (DuPont Nomex) at a coating weight of approximately 10 grams per square meter and the coating was cured sequentially after each layer was deposited using focused 200 W/cm UV source with an iron doped mercury bulb.

Strips of fluoro-elastomer and silicone compounds containing initiators or other curing agents were placed on each side of the adhesion promoted textile and then treated at approximately 175° C. in a 40 tonne upstroking press for 25 minutes to cure the fluoro-elastomer and silicone rubber and bond them to the textile.

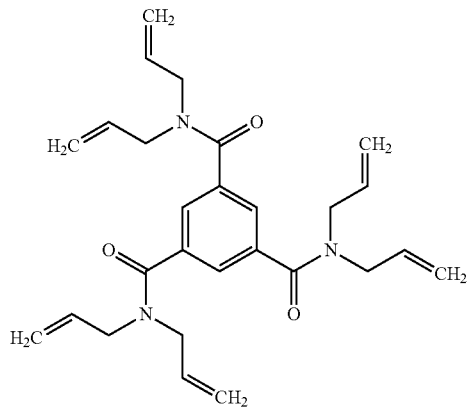

benzene-1,3,5-tricarboxylic acid-tris-N, N-Diallylamide

Synthesis of Benzene-1,2,4-tricarboxylic acid-tris-N,N-Diallylamide

A mixture of N,N-Diallylamine (128.26 g, 1.32 moles) and dichloromethane (106.0 g, 1.248 moles) was added to a funnel and added dropwise over 75 minutes to a reaction vessel containing a cooled mixture (10° C.) of 1,3,5-trimesoyl chloride (53.1 g, 0.200 moles) in dichloromethane (530.0 g, 6.24 moles) with constant stirring. The temperature was maintained at <10° C. for the duration of the addition of the diallylamine solution and then left to return to room temperature over another 60 minutes with constant stirring. The organic reaction product was then washed with an excess of water (1×600 ml and 2×300 ml) to remove the hydrochloride salt of the diallylamine, followed by drying over MgSO$_4$. Solids were then filtered off and the solvent removed under vacuum. The crude product was then purified by column chromatography using a silica column and dichloromethane as eluent. The dichloromethane was again removed under vacuum to yield a pale yellow, viscous product. Yield 60.2%.

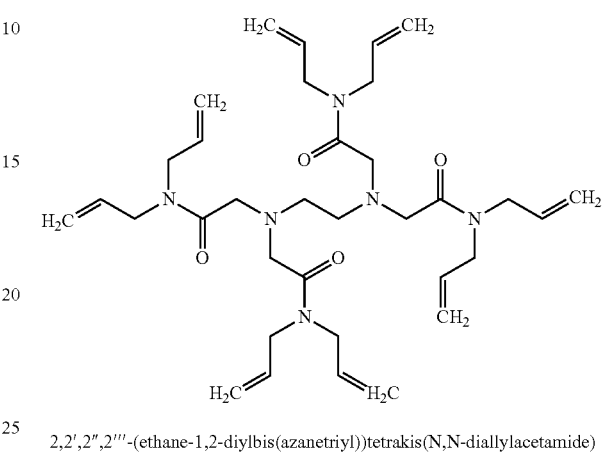

2,2',2'',2'''-(ethane-1,2-diylbis(azanetriyl))tetrakis(N,N-diallylacetamide)

Synthesis of 2,2',2'',2'''-(ethane-1,2-diylbis(azanetriyl))tetrakis(N,N-diallylacetamide)

A mixture of 4-dimethylamino pyridine (0.5 g), dicyclohexylcarbodiimide (103.0 g), ethylenediamine tetraacetic acid (36.0 g), diallylamine (53.0 g) and dichloromethane (250 g) was added to a reaction vessel and maintained at approximately 20° C. for 120 hours with constant stirring. Solids, including urea formed in the reaction, were then removed by filtration followed by the removal of amine and solvent under vacuum. After removal of impurities a clear, viscous oil was obtained (~65%).

EXAMPLE 4 ADHESION PROMOTION OF A POLY(ESTER) TEXTILE TO SILICONE RUBBER AND FLUOROELASTOMER USING N,N-DIALLYL HEXANAMIDE AND N,N,N',N'-TETRAALLYLETHANEDIAMIDE

To a mixture of N,N-diallyl hexanamide and N,N,N',N'-Tetraallylethanediamide in the ratio of 9:1 by weight a thermal initiator (Vazo 67, DuPont) was added initially at 1% weight of total mixture and increased by 1% after each hour of reaction until 5% was added with a total reaction time of 8 hours; reaction temperature was maintained at 70° C. over the whole reaction period. A viscous yellow oil was produced. To this a photoinitiator (Ciba Irgacure 819) was added at 2% by weight of total solution and mixed thoroughly. This formulation was then applied onto each side of a strip of knitted poly(ester) fabric at a coating weight of approximately 5 grams per square meter with UV curing performed sequentially after each layer was deposited.

Strips of fluoro-elastomer and silicone compound were placed on each side of a knitted poly(ester) fabric coated with the adhesion promoting layer and then treated at 190° C. at 45-75 psi for 25 minutes to cure fluoro-elastomer and silicone rubber and bond them to the textile.

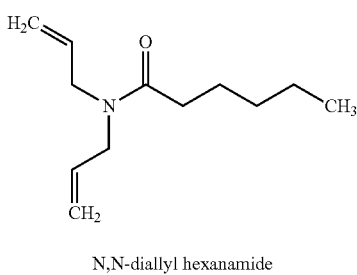

N,N-diallyl hexanamide

Synthesis of N,N-diallylhexanamide

A mixture of diallylamine (>99%, 70.85 g), dichloromethane (265.0 g) and triethylamine (>98%, 73.4 g)) was added dropwise to a stirred mixture of hexanoyl chloride (>98%, 96.15 g) and dichloromethane (530.0 g) over 195 minutes with temperature maintained between 0-10° C. Following this the reaction vessel was allowed to warm to room temperature with stirring of the mixture maintained for a further 60 minutes. The resulting reaction liquor was washed in HCl (3M, 600 ml) and the organic phase separated and dried over anhydrous MgSO$_4$. After filtration, volatiles including the dichloromethane, were removed under vacuum and the crude product further purified by column chromatography using silica and ethyl acetate as eluent. Ethyl acetate was removed from the product under vacuum to yield a yellow oil, yield 64%.

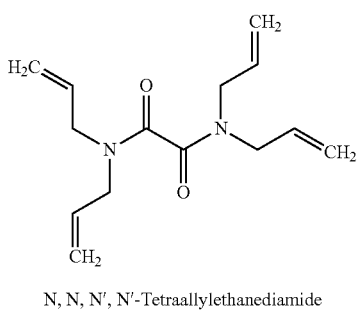 [SMILES: C=CCN(CC=C)C(=O)C(=O)N(CC=C)CC=C]

N, N, N', N'-Tetraallylethanediamide

EXAMPLE 5 ADHESION PROMOTION OF ACID DYES TO M-ARAMID FABRIC USING AN ADHESION PROMOTION LAYER CONSISTING OF A COPOLYMER OF N,N-DIALLYL-2 (BUTYLDIALLYLCARBAMOYLMETHYLAMINO) ACETAMIDE AND N,N-DIALLYL-3-(PROPYLAMINO)PROPANAMIDE

A mixture of N,N-Diallyl-2-(butyl-diallylcarbamoylmethylamino)acetamide (74.4 g) and N,N-Diallyl-3-(propylamino)propanamide (18.6 g) was pre-heated at 70° C. after which thermal initiator (DuPont Vazo67, 5.0 g) was added with constant stirring. The reaction mixture was maintained at 70° C. for 10 hours with continuous stirring to produce a viscous liquid, after which photoinitiator was added (Ciba Irgacure 819, 2.0 g) and dissolved fully into the mixture.

This formulation was then coated onto m-aramid fabric using a reverse roller method to approximately 20 grams per square meter coat weight and cured under a 200 W/cm UV lamp using a gallium doped mercury bulb.

Acid dyeing of the treated textile was performed by the application of a water based print paste, which contained the acid dye in solution. The paste was liberally applied to the textile, followed by heating of the dyed textile at 130° C. for 60 minutes followed by heating at 180° C. for 5 minutes. After cooling the dyed textile was washed in an alkaline solution of potassium carbonate (pH 10), rinsed in water and then dried.

Alternatively, the treated textile was simply treated with an acid dye in aqueous solution, for instance acid green 25 at 5% concentration, and then heated for 10 minutes at 70° C. The sample was then washed in water, then an alkaline solution of potassium carbonate (pH 10) and again rinsed in water before drying.

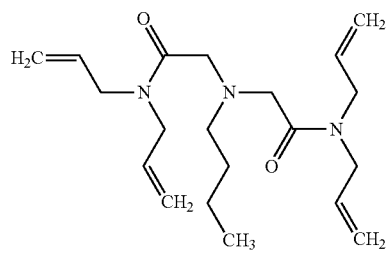

N, N-Diallyl-2-(butyl-diallylcarbamoylmethylamino) acetamide

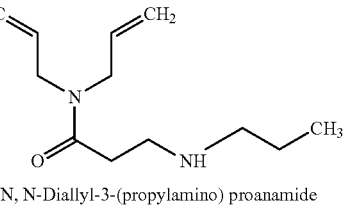

N, N-Diallyl-3-(propylamino) proanamide

Synthesis of N,N-Diallyl-2-(butyl-diallylcarbamoyl-methylamino)acetamide

Chloroacetyl chloride (>98%, 212 g, 1.883 moles) and dichloromethane (397.5 g, 4.680 moles) were added to a reaction vessel and cooled to 5° C. N,N-diallylamine (freshly distilled, 402.57 g, 4.143 moles) was added to ichloromethane (397.5 g, 4.680 moles) and this mixture was then added dropwise to the chloroacetyl chloride mixture over several hours with constant stirring with the temperature kept below 10° C. The reaction mixture was then left to reach room temperature and then washed in water (1.5 l). The organic phase was washed again in water, followed by separation of the organic phase. Solvent and volatiles were then removed from the organic phase under vacuum to yield a yellow oil, which was further purified by column chromatography with ethyl acetate eluent and silica. Eluent was removed under vacuum to yield a yellow oil. Yield ~78%.

N,N-Diallyl-2-chloroacetamide (intermediate) (86.75 g, 0.500 moles), triethylamine (154.38 g, 1.500 moles) and tetrahydrofuran (222.25 g, 3.082 moles) were charged into a reaction flask with 1-butylamine (99%, 18.29 g, 0.250 moles) added dropwise over 15 minutes with constant stirring. The temperature of the reaction was brought to reflux and maintained for 4 hours. The reaction was then cooled to room temperature followed by filtration of the triethylamine hydrochloride salt from the reaction liquor. After removal of solvent under vacuum the product was added to dichloromethane (200 ml) and then washed twice in water (300 ml). The organic phase was separated, dried with magnesium sulfate and filtered. This was followed by removal of solvent under vacuum to yield a pale yellow oil. Yield ~88%

Synthesis of N,N-Diallyl-3-(propylamino)propanamide 3-bromopropionylchloride in dichloromethane (1:1 v/v) was added drop wise to a slight molar excess of diallylamine in dichloromethane (DCM) at ~10° C. over 2 hours with constant stirring. This was then washed in dilute HCl and dichloromethane and the organic fraction retained. The solution of product in DCM was then purified by column chromatography using silica (60 A) and the DCM removed to yield the 3-bromo-N,N-diallylpropylamide intermediate; a yellow liquid. Yield 70%.

The 3-bromo-N,N-diallylpropylamide intermediate (30 g, 129 mmoles) was added to THF (1:1 v/v). This was then added dropwise over 2 hours into a stirred, refluxing mixture of 1-propylamine (43.1 g, 0.730 mmoles), potassium carbonate (90 g, 0.652 mmoles) and THF (133.6 g, 1.850 mmoles). The reflux was then left to cool over 1 hour with constant stirring.

The cooled reaction mixture was washed in water (400 ml), dissolving the potassium carbonate and leaving a clear, yellow organic top layer, which was decanted off. This layer was then washed again in water, separated and dried to yield a yellow liquid N,N-Diallyl-3-(propylamino)propanamide product. Yield ~65%.

EXAMPLE 6 ADHESION PROMOTION OF ACID DYES TO M-ARAMID FABRIC USING AN ADHESION PROMOTION LAYER CONSISTING OF BENZENE-1,3,5-TRICARBOXYLIC ACID-TRIS-N,N-DIALLYLAMIDE

Benzene-1,3,5-tricarboxylic acid-tris-N,N-Diallylamide was mixed with photoinitiator (ITX, 3% by weight) and amine synergist (4-Dimethylaminobenzoate, 2% by weight) and then applied by reverse roller method to an m-aramid fabric at 20 grams per square meter coating weight. This was cured under a focused 200 W/cm UV lamp using an Iron doped mercury bulb.

Acid dyeing of the treated textile was performed by the application of a water based print paste, which contained the acid dye in solution. The paste was liberally applied to the textile, followed by heating of the dyed textile at 130° C. for 60 minutes followed by heating at 180° C. for 5 minutes. After cooling the dyed textile was washed in an alkaline solution of potassium carbonate (pH 10), rinsed in water and then dried.

Synthesis of Benzene-1,3,5-tricarboxylic acid-tris-N,N-Diallylamide

A mixture of N,N-Diallylamine (>99%, 128.26 g, 1.32 moles) and dichloromethane (106.0 g, 1.248 moles) was added to a funnel and added dropwise over 75 minutes to a reaction vessel containing a cooled mixture (10° C.) of 1,3,5-trimesoyl chloride (53.1 g, 0.200 moles) in dichloromethane (530.0 g, 6.24 moles) with constant stirring. The temperature was maintained at <10° C. for the duration of the addition of the diallylamine solution and then left to return to room temperature over another 60 minutes with constant stirring. The organic reaction product was then washed with an excess of water (1×600 ml and 2×300 ml) to remove the hydrochloride salt of the diallylamine, followed by drying over anhydrous $MgSO_4$. Solids were then filtered off and the solvent removed under vacuum. The crude product was then purified by column chromatography using a silica column and dichloromethane as eluent. The dichloromethane was again removed under vacuum to yield a pale yellow, viscous product. Yield 60.2%.

Basic dyes may be applied in a similar way and may show enhanced dyeing when an acid group is present as part monomer structure.

EXAMPLE 7 ADHESION PROMOTION OF BASIC DYES TO M-ARAMID FABRIC USING AN ADHESION PROMOTION LAYER CONSISTING OF 4-(DIALLYLAMINO)-4-OXOBUTANOIC ACID AND N,N,N',N'-TETRAALLYLETHANEDIAMIDE

A mixture of 4-(Diallylamino)-4-oxobutanoic acid and N,N,N',N'-Tetraallylethanediamide was prepared in the ratio 3:1 by weight respectively. To this photoinitiator was added (Ciba Irgacure 819, 3% by weight to total monomer) and stirred until fully dissolved. This formulation was then coated onto m-aramid fabric using a reverse roller method to approximately 20 grams per square meter coat weight and cured under a focused 120 W/cm UV source using a gallium doped mercury bulb.

The treated fabric was then dyed by immersion of the fabric in a solution of basic blue 26 (3 wt % solution) in water at 70° C. for 10 minutes. This was followed by washing of the fabric in a dilute acetic acid solution, rinsing in thoroughly in water and drying with warm air.

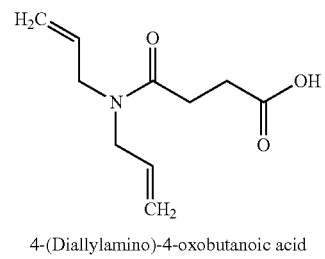

4-(Diallylamino)-4-oxobutanoic acid

Synthesis of 4-(Diallylamino)-4-oxobutanoic acid

A solution of diallylamine (>99%, 24.5 g) in dichloromethane (50 ml) was added drop-wise over 1 hour to a solution of succinic anhydride (>98%, 25.3 g) in dichloromethane (200 ml) with constant stirring. The temperature throughout the addition of the diallylamine was maintained between 10-20° C. and with constant stirring throughout the reaction. After all the diallylamine was added the reaction was allowed to proceed for 30 minutes, after which the mixture was washed once with HCl (100 ml, 3 molar), once with saturated potassium carbonate solution (200 ml) and then twice in water (200 ml). The organic phase was dried over $MgSO_4$, filtered and the solvent then removed in vacuum to yield a pale yellow oil.

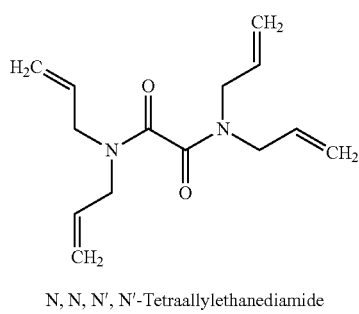 [SMILES: C=CCN(CC=C)C(=O)C(=O)N(CC=C)CC=C]

N, N, N', N'-Tetraallylethanediamide

EXAMPLE 8 ADHESION PROMOTION OF AN ACID DYE TO NYLON 6,6 FABRIC USING AN ADHESION PROMOTION LAYER CONSISTING OF A COPOLYMER OF N,N-DIALLYL-2 (BUTYLDIALLYLCARBAMOYLMETHYLAMINO) ACETAMIDE AND N,N-DIALLYL-3-(PROPYLAMINO)PROPANAMIDE

A mixture of N,N-Diallyl-2-(butyl-diallylcarbamoylmethylamino)acetamide (56.0 g) and N,N-Diallyl-3-(propylamino)propanamide (14.0 g) was pre-heated to 75° C. To this mixture a solution of thermal initiator (DuPont Vazo 67, 3.0 g) in N, N-Diallyl-2-(butyl-diallylcarbamoylmethylamino) acetamide (21.6 g) and N,N-Diallyl-3-(propylamino) propanamide (5.4 g) was added over 10 hours with temperature maintained at 75° C. with constant stirring and under a nitrogen atmosphere. After the 10 hours reaction time the solution was left to cool and the photoinitator 2-isopropyl thioxanthone (ITX) (2.0 g) and synergist ethyl 4-(dimethylamino)benzoate (EDB) (3.0 g) were added. Both additives were fully dissolved and mixed into the monomer mixture prior to use.

This formulation was then coated onto nylon 6,6 fabric using a reverse roller method to approximately 20 grams per square meter coat weight and cured under a 200 W/cm UV lamp using a gallium doped mercury bulb.

Acid dyeing of the treated textile was performed by the application of a water based print paste, which contained the acid dye in solution. The paste was liberally applied to the textile, followed by heating of the dyed textile at 130° C. for 60 minutes followed by heating at 180° C. for 5 minutes. After cooling the dyed textile was washed in an alkaline solution of potassium carbonate (pH 10), rinsed in water and then dried.

EXAMPLE 9 ADHESION PROMOTION OF AN ACID DYE TO M-ARAMID FABRIC USING AN ADHESION PROMOTION LAYER CONSISTING OF A POLYMER MADE WITH N,N-DIALLYL-2 (-BUTYL-DIALLYLCARBAMOYLMETHYL-AMINO)ACETAMIDE

N,N-Diallyl-2-(butyl-diallylcarbamoylmethylamino)acetamide (70.0 g) was pre-heated to 75° C. after which a mixture of thermal initiator (DuPont Vazo 67, 3.0 g) in N,N-Diallyl-2-(butyl-diallylcarbamoylmethylamino)acetamide (27.0 g) was added over 10 hours with the temperature maintained at 75° C. with constant stirring and under a nitrogen atmosphere. After the 10 hours reaction time the solution was left to cool and the photoinitator 2-isopropyl thioxanthone (ITX) (2.0 g) and synergist ethyl 4-(dimethylamino)benzoate (EDB) (3.0 g) were added. Both additives were fully dissolved and mixed into the monomer mixture prior to use.

This formulation was then coated onto m-aramid fabric using a reverse roller method to approximately 10 grams per square meter coat weight and cured under a 200 W/cm UV lamp using an iron doped mercury bulb.

Acid dyeing of the treated textile was performed by the application of a water based print paste, which contained the acid dye in solution. The paste was liberally applied to the textile, followed by heating of the dyed textile at 130° C. for 60 minutes followed by heating at 180° C. for 5 minutes. After cooling the dyed textile was washed in an alkaline solution of potassium carbonate (pH 10), rinsed in water and then dried.

EXAMPLE 10 ADHESION PROMOTION OF A POLY(ARAMID) TEXTILE TO SILICONE RUBBER AND FLUOROELASTOMER USING A MIXTURE OF N,N-DIALLYL-3-(PROPYLAMINO)PROPANAMIDE, BENZENE-1,3,5-TRICARBOXYLIC ACID-TRIS-N,N-DIALLYLAMIDE AND THE FLUORINATED MONOMER, 2,2,3,3,4,4,5,5,6,6,7,7,8,8-PENTADECAFLUORO-N,N-DI(PROP-2-EN-1-YL)OCTANAMIDE

A mixture of N,N-Diallyl-3-(propylamino)propanamide (85.5 wt %), benzene-1,3,5-tricarboxylic acid-tris-N,N-Diallylamide (9.5 wt %), 2,2,3,3,4,4,5,5,6,6,7,7,8,8-pentadecafluoro-N,N-di(prop-2-en-1-yl)octanamide (2 wt %) and the photoinitiator Irgacure 127 (3 wt %, Ciba SC) was applied onto each side of a strip of m-aramid cloth (DuPont Nomex) at a coating weight of approximately 10 grams per square meter. The coating was cured sequentially after each layer was deposited using focused 200 W/cm UV source with an iron doped mercury bulb.

Strips of fluoro-elastomer and silicone compounds containing initiators or other curing agents were placed on each side of the adhesion promoted textile and then treated at approximately 175° C. in a 40 tonne up-stroking press for 25 minutes to cure the fluoro-elastomer and silicone rubber and bond them to the textile.

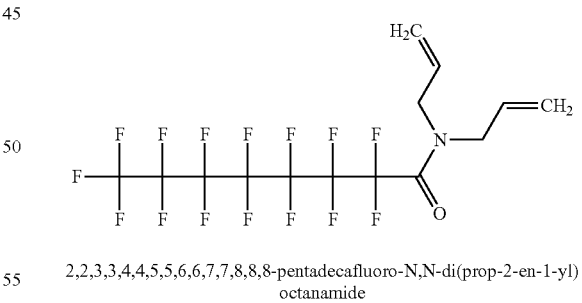

2,2,3,3,4,4,5,5,6,6,7,7,8,8-pentadecafluoro-N,N-di(prop-2-en-1-yl)octanamide

Synthesis of 2,2,3,3,4,4,5,5,6,6,7,7,8,8-pentadecafluoro-N,N-di(prop-2-en-1-yl)octanamide A mixture of perfluorooctanoyl chloride (20.0 g) and dichloromethane (1.6 g) was added drop-wise over 1 hour to a stirring mixture of diallylamine (9.88 g, >99%) and dichloromethane (1.72 g), cooled to 0° C. The reaction was allowed to warm to room temperature with continuous stirring for a further hour.

The product was washed with water (500 ml) twice, followed by the removal of the dichloromethane under vacuum to yield a very low viscosity orange-yellow liquid (yield 79%).

The invention claimed is:

1. A method of bonding textile fibers to a low surface energy elastomer including the steps of:
   providing a polymeric precursor which includes a group of sub-formula (I)

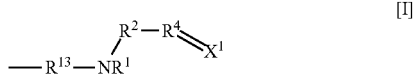

wherein:
   $R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and
   $R^4$ and $R^5$ are independently selected from CH or $CR^{11}$ where $R^{11}$ is an electron withdrawing group,
   $X^1$ is a group $CX^2X^3$, $Y^1$ is a group $CY^2Y^3$, and $X^2$, $X^3$, $Y^2$ and $Y^3$ are independently selected from hydrogen, fluorine or other substituents,
   $R^1$ is selected from hydrogen, halo, nitro, hydrocarbyl, optionally substituted or interposed with functional groups, or —$R^3$-$R^5$=$Y^1$, and
   $R^{13}$ is C(O) or S(O)$_2$;
   coating the textile fibers with the polymeric precursor;
   polymerising the polymeric precursor so as to produce a polymeric coating on the textile fibers; and
   contacting the textile fibers with the low surface energy elastomer.

2. A method according to claim 1 in which the polymeric precursor is a compound of structure (II)

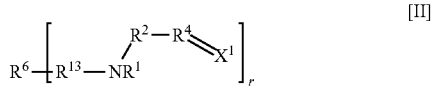

where r is an integer of 1 or more and $R^6$ is one or more of a bridging group, an optionally substituted hydrocarbyl group, a perhaloalkyl group, a siloxane group, an amide, or a partially polymerised chain containing repeat units.

3. A method according to claim 2 in which the polymeric precursor is a compound of structure [III]

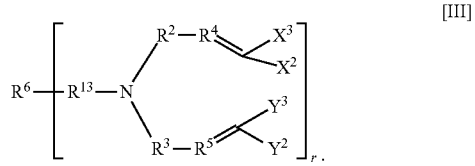

4. A method according to claim 2 in which $R^6$ comprises a straight or branched chain hydrocarbyl group, optionally substituted or interposed with functional groups.

5. A method according to claim 4 in which the straight or branched chain is interposed or substituted with one or more of an amine moiety, C(O) or COOH.

6. A method according to claim 5 in which the polymeric precursor is a monomer in which $R^6$ is a straight or branched chain hydrocarbyl interposed with an amine moiety, or a pre-polymer obtained by pre-polymerisation of said monomer.

7. A method according to claim 5 in which the polymeric precursor is a monomer in which $R^6$ is a straight or branched chain hydrocarbyl substituted with a COOH end group, or a pre-polymer obtained by pre-polymerisation of said monomer.

8. A method according to claim 7 in which the monomer is a compound of Formula (VI)

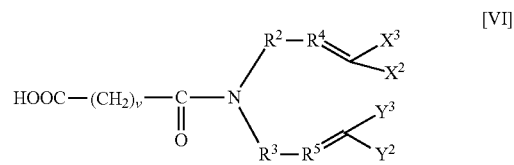

where v is 1 to 20.

9. A method according to claim 4 in which the polymeric precursor is a monomer in which $R^6$ is a straight or branched chain alkyl group having 1 to 30 carbon atoms, or a pre-polymer obtained by pre-polymerisation by said monomer.

10. A method according to claim 4 in which the polymeric precursor is a monomer in which $R^6$ is a partially or per-halogenated straight or branched chain alkyl group having 1 to 30 carbon atoms, or a pre-polymer by pre-polymerisation of said monomer.

11. A method according to claim 6 in which the polymeric precursor is a monomer in which $R^{13}$ is CO and $R^6$ terminates in one or more amine moieties thereby forming a urea structure, or a pre-polymer obtained by pre-polymerisation of said monomer.

12. A method according to claim 2 in which the polymeric precursor is a monomer of structure (VII)

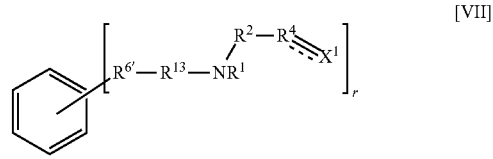

where $R^6$ is a straight or branched chain hydrocarbyl group, optionally substituted or interposed with functional groups, and r is an integer of 2 or more, or a pre-polymer obtained by pre-polymerisation of said monomer.

13. A method according to claim 1 in which the textile fibers are synthetic fibers.

14. A method according to claim 13 in which the textile fibers include aramid, nylon or polyester fibers.

* * * * *